Figure 1:
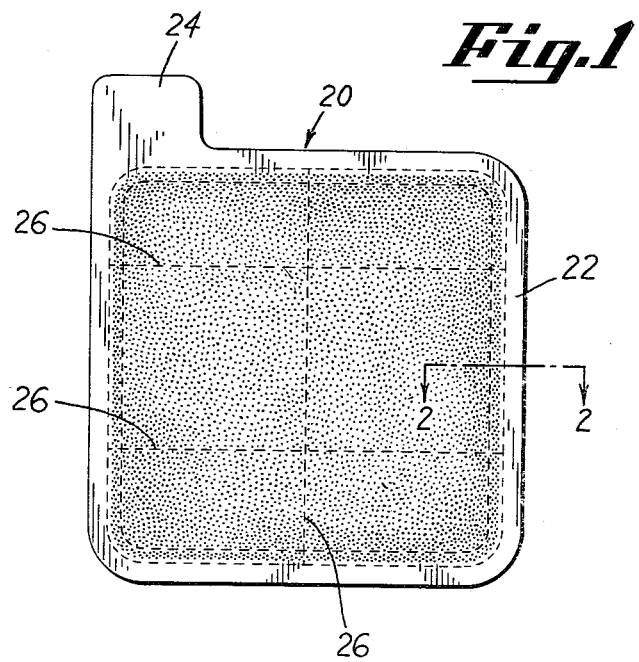

Feb. 11, 1964     L. V. PULS     3,121,030
STORAGE BATTERY PLATES
Filed Dec. 18, 1961

INVENTOR.
LAWRENCE V. PULS
BY
HIS ATTORNEY

United States Patent Office 3,121,030
Patented Feb. 11, 1964

3,121,030
STORAGE BATTERY PLATES
Lawrence V. Puls, Madison Heights, Mich., assignor to General Motors Corporation, Detroit, Mich., a corporation of Delaware
Filed Dec. 18, 1961, Ser. No. 159,868
2 Claims. (Cl. 136—27)

This invention relates to storage batteries and is particularly concerned with a storage battery plate and a method of making same for use.

It is therefore the main object of the invention to provide a novel method for making lead oxide plates wherein the plates are formed directly from the oxide and wherein a grid of lead is no longer necessary to support the plate material.

A further object of the invention is to provide a plate formed by the above noted method.

Another object of the invention is to provide a storage battery plate, particularly a negative plate and method of making same, wherein lead oxide in particulate form is coated with a cementing material fully compatible therewith both electrically and chemically and wherein said coated lead oxide is then formed by pressure alone into plates having good strength and electrical characteristics that are comparable to plates made by presently known methods.

In carrying out the above object, it is another object to coat the lead oxide particles with lead hydroxide as a cementing material wherein the lead hydroxide is formed in situ on the lead dioxide whereupon the coated particles of lead dioxide are filtered, washed and dried preparatory to forming them into a sheet suitable for use as a battery plate.

Further objects and advantages of the present invention will be apparent from the following description, reference being had to the accompanying drawings wherein preferred embodiments of the present invention are clearly shown.

Figure 2:
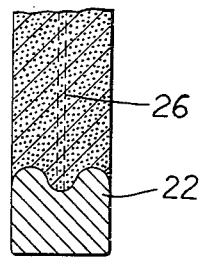
Figure 3:
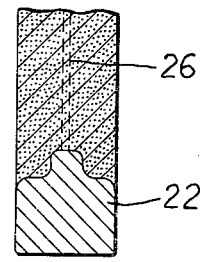

In the drawings:

FIGURE 1 is a view in elevation of a battery plate;
FIGURE 2 is a view taken on line 2—2 of FIGURE 1; and
FIGURE 3 is a modification of the cross sectional view of the frame of the battery plate shown in FIGURES 1 and 2.

Heretofore, battery plates used in lead acid type storage batteries have been made by first producing a lead or lead alloy grid having a frame or border of substantial thickness and having a plurality of cross wires generally in perpendicular planes for forming a plurality of either square or rectangular pockets wherein the cross section or shape of the wire is such that when lead oxide is pasted into the grid it is interlocked to some degree mechanically with the grid. Grids of this general character are shown and disclosed in Bates Patent 2,831,910 and Harrison Patent 2,756,629, both of which are assigned to the assignee of the present invention.

The paste used in pasting these grids is generally a mixture of lead dioxide and sulfuric acid either alone or in combination with some type of expander. This paste is plastic in form and is applied to the grids by a pasting machine, for example, a machine as disclosed in Lund Patent 2,375,424. The expander material may take the form of any of a number of additives ranging from waste sulfite liquor to materials as disclosed in Hindell Patent 2,436,299. The grids, after pasting, are subjected to drying and curing operations as is well-known in the art. In all of the prior art battery plates the grid forms a substantial part of the plate both from a cost and weight standpoint. Considerable lead is necessarily included in the grid and the weight thereof adds materially to the over-all weight of the battery.

The present invention is specifically directed to a new type of negative plate and method of making same wherein the conventional heavy lead grid is eliminated and wherein a light lead frame is used with or without a few supporting cross wires therein. This frame is used as a carrier for the plate material or lead dioxide which in dry form is cold compressed into the frame to form an integrated structure having equally good electrical characteristics to previous plates and having a strength comparable with conventional plates. It is apparent that such a structure materially reduces the cost of making plates due to the reduction in the amount of lead used in the framework, the elimination of pasting equipment and procedures, etc.

Specifically, I have found that when lead dioxide is treated with a suitable cementing material which is compatible electrically and chemically with the plate components the lead dioxide may be directly compacted while cold into a self-sustaining sheet. This sheet when carried by a lead framework makes a highly satisfactory battery plate.

One important feature of the invention, however, is to completely coat each lead dioxide particle with the cementing material and for this reason the cementing material is preferably coated onto the lead dioxide particles by precipitation from a solution carrying the lead dioxide in agitated form and wherein the solution includes materials which may be reacted to cause direct precipitation of the lead hydroxide in situ upon the surfaces of the suspended lead dioxide particles.

An example of my procedure is as follows. About 100 parts by weight of lead nitrate is dissolved in 150 parts of water at room temperature. To this solution is added about 15 parts by weight of lead dioxide powder and the solution with powder therein is agitated to maintain the particles of the lead dioxide in suspension. While the agitation is continued, ammonium hydroxide is added in quantities sufficient to react with the lead nitrate and precipitate lead hydroxide directly and in situ on the particles of lead dioxide. This may be accomplished by adding approximately 25 parts by weight of a 28–30% ammonium hydroxide solution to the agitated mixture. The material is then filtered to remove the coated lead dioxide particles which are thoroughly washed to remove traces of extraneous materials. Thereafter, the coated powder is dried at about 200° F. for an hour preferably under a vacuum. Next, the lead dioxide coated with a lead hydroxide is formed into the desired shape at pressures in the order of 2000 lbs. per square inch to form a plate of a highly porous character which is self-sustaining and which will remain solid even after immersion in 30% sulfuric acid over an extended period of time.

It is apparent that the specific quantities of materials noted above are given as an example only and that the quantity of water, lead nitrate, lead dioxide ammonium hydroxide, etc. may vary as is well-known in the art, the only important factor being that sufficient ammonium hydroxide is added to the solution to cause precipitation. Quantities as specified above yield optimum results.

It is also contemplated that the lead dioxide may be pretreated with a 35% sulfuric acid solution to condition the surface thereof for acceptance of the lead hydroxide. This pretreatment is not necessary to the success of the invention but improves the over-all result which I have used. Similarly, the ratio of lead hydroxide to lead dioxide may be varied in accordance with the ultimate strength desired in the battery plate and this may generally best be arrived at by trial for the particular type of frame to be used and the general extent of the plate. In other words, the strength of the sheeted material will dictate to a large degree the quantity of cementing material to be used. Specific drying techniques may also vary from the one disclosed wherein different temperatures may be used and the like. In place of lead nitrate any other soluble lead salt may be used. Also, any hydroxide may be used as a precipitating agent, the only precaution being that the salt which results from the double decomposition reaction is soluble so as to be capable of elimination during washing.

It is further to be understood that the pressure at which the plate is formed to a large degree measures the porosity thereof and, therefore, the briquetting or compacting pressure together with the size of particles of lead dioxide used may be varied in order to obtain various porosities in the finished plate. Similarly, it may be desirable to compact the plate at a slightly elevated temperature, for example, something above room temperature. In this instance, care should be taken that no change in state occurs with respect to the particles being briquetted.

The formation of the lead hydroxide coating in situ by actual precipitation thereof onto the surface of the particles is of utmost importance. I have found by test that it is impossible to produce the satisfactory cementation of the lead dioxide particles by merely mixing lead hydroxide particles therewith. Therefore, the in situ formation of the coating is the main feature of this invention.

Referring specifically to the drawings, one type of frame is shown at 20. This includes an outer heavy frame 22 which surrounds the periphery of the plate having an integrally formed electrical connecting tab 24 at one corner thereof. The outer frame 22 may have a cross section as shown in FIGURE 2 or 3 wherein either a groove or protuberance is provided which interlocks to some degree with the lead material compacted therein.

In large plates it may be desirable to place a few cross wires in the frame such as shown in dotted lines in FIGURE 1 at 26. These cross wires merely aid in supporting the large planar surface of the active material to prevent collapse thereof. All of these expedients come fully within the scope of the invention.

While the embodiments of the present invention as herein disclosed constitute preferred forms, it is to be understood that other forms might be adopted.

What is claimed is as follows:

1. A battery plate consisting essentially of a cast predominantly lead framework surrounding and carrying a compacted sheet of lead dioxide wherein each particle of lead dioxide is cemented to every adjacent particle and wherein the sheet is cemented to the frame by means of an in situ coating of lead hydroxide over all of the said particles.

2. In a method for forming negative plates for lead acid storage batteries the steps comprising; suspending lead dioxide particles in a water solution of a soluble salt of lead, adding a hydroxide to said solution in quantities sufficient to cause the in situ precipitation of lead hydroxide directly on to the particles of lead dioxide, filtering said coated particles from the solution, washing and drying the particles and then compacting the coated, washed and dried particles at pressures sufficient to form a self-sustaining sheet wherein the said particles are bonded together at their interfaces by lead hydroxide.

References Cited in the file of this patent
UNITED STATES PATENTS

| | | |
|---|---|---|
| 524,710 | Fitzgerald | Aug. 21, 1894 |
| 723,327 | Sperry | Mar. 24, 1903 |